United States Patent [19]

Pipes

[11] Patent Number: 4,657,463
[45] Date of Patent: Apr. 14, 1987

[54] AUTOMATED GUIDED VEHICLE

[75] Inventor: George R. Pipes, Salt Lake City, Utah

[73] Assignee: Eaton-Kenway, Inc., Salt Lake City, Utah

[21] Appl. No.: 827,186

[22] Filed: Feb. 6, 1986

Related U.S. Application Data

[63] Continuation of Ser. No. 702,516, Feb. 19, 1985, abandoned.

[51] Int. Cl.[4] .................................................. B60P 1/02
[52] U.S. Cl. ........................... 414/495; 180/79.3; 187/24; 254/7 C; 280/100; 280/96; 280/114; 280/125; 280/130; 414/349; 414/498
[58] Field of Search ............... 414/267, 281, 284, 279, 414/349, 495, 498; 180/19.2, 79.3; 280/100, 96, 113, 114, 125, 130; 187/24, 25; 254/7 C

[56] References Cited

U.S. PATENT DOCUMENTS

| | | | |
|---|---|---|---|
| 687,588 | 11/1901 | Thomson | 280/96 |
| 747,531 | 12/1903 | Boyd | 280/100 |
| 1,267,487 | 5/1918 | Wilson | 280/100 |
| 1,377,096 | 5/1921 | Sandstrom | 280/100 |
| 1,472,054 | 10/1923 | Drake | 414/267 |
| 1,938,120 | 12/1933 | Spohn | 280/100 |
| 2,385,090 | 9/1945 | Lowy | 180/79.3 X |
| 2,478,327 | 8/1949 | Schreck | 180/19.2 X |
| 2,765,650 | 10/1956 | Youngclaus | 280/100 |
| 3,768,628 | 10/1973 | Bross | 414/495 X |
| 3,851,854 | 12/1974 | Roybal | 254/7 C |
| 3,964,619 | 6/1976 | Irmler | 414/281 |
| 4,137,984 | 2/1979 | Jennings et al. | 414/279 X |
| 4,395,186 | 7/1983 | Whyte | 280/100 X |

*Primary Examiner*—Frank E. Werner
*Attorney, Agent, or Firm*—D. A. Rowe; F. M. Sajovec

[57] ABSTRACT

A vehicle (10) particularly adapted for use as an automated guided vehicle uses standard plastic tote boxes as a body shell (13) and as a battery carrier (20). The vehicle includes a drive wheel assembly (14) and a bogey assembly (16) which pivot about center pivot points and are steered by a single motor-driven steering assembly (18) which provides dual fifth wheel steering. Commonly-driven ball screw lift assemblies (122) engage the underside of nestable load-carrying tote boxes (22) for pickup and delivery functions. The weight of the load carrier(s) is transferred through the vehicle frame (12) to load transfer assemblies (76) on the drive and bogey assemblies.

12 Claims, 9 Drawing Figures

AUTOMATED GUIDED VEHICLE

This is a continuation of application Ser. No. 702,516, filed 02/19/85, now abandoned.

The present invention relates to automated guided vehicles (AGV), and more particularly to a very compact, lightweight vehicle which is specifically adapted for use in an integrated manufacturing system.

Automated guided vehicles are well known in the art. Such vehicles generally follow a guide wire buried in the floor to move goods or components from one point to another under computer control. Systems are also in use which follow an optical guide path. In most warehousing operations, the vehicles are usually general-purpose vehicles adapted to carry pallet size loads or other standardized load configurations. Other known AGV systems employ specifially designed vehicles which are configured particularly to carry components such as automobile chassis or engine components in an automobile assembly operation.

Recently, considerable interest has been generated in integrated manufacturing systems for relatively small-scale assembly operations such as electronic assembly. In these systems, parts and components are stored in tote boxes in high-rise storage systems, the tote boxes being moved automatically to assembly stations where parts are removed as required and assembled into finished components. Once assemblies and subassemblies are completed, there is a need to move them on to additional assembly stations or to distribution points. Conventional conveyor systems are useful under some circumstances; however, they tend to lack the flexibility required to take full advantage of the flexibility of a computer controlled manufacturing system.

Computer controlled guided vehicle systems are well adapted in concept for use in conjunction with flexible manufacturing systems; however, the size and complexity of AGV systems now in general use are unsuitable for small parts assembly applications.

What the present invention is intended to provide is a very compact, lightweight vehicle adapted for wire or other automatic guidance systems. Since a large number of such vehicles are likely to be required for a typical integrated manufacturing system, cost and simplicity of construction are important factors.

To meet the above objective, the present invention provides a vehicle which is essentially the same size as the tote boxes which form the basic storage units of the flexible manufacturing system, and which, in fact, can use actual tote boxes as body shell components of the vehicle. The vehicle is particularly configured to carry the nestable tote boxes used in a small component flexible manufacturing system; therefore, the load platform of the vehicle is designed to receive tote boxes in nesting relation. A further feature of the present invention is the adaptation of nestable tote box to serve as a battery carrier for the vehicle; thus, facilitating the replacement and recharging of the batteries.

Other objects and advantages of the invention will be apparent from the following description when taken in connection with the accompanying drawings, wherein.

Referring to the drawings, there is illustrated a self-powered vehicle 10 of the type which is particularly adapted to operate under computer control to follow a guidepath defined in a warehouse or a manufacturing facility. As can be seen by referring to page 1, the vehicle 10 as illustrated is extremely compact, having a length of about twenty nine inches and a height of about seventeen inches. In the preferred embodiment illustrated herein, the vehicle comprises a main frame assembly 12, a steerable drive wheel assembly 14, a steerable bogey assembly 16, a steering system 18 operable to simultaneously steer both wheel assemblies, a battery carrier 20 mounted on the main frame, and a plurality of load carriers 22 stacked onto the battery carrier.

Figure 1:
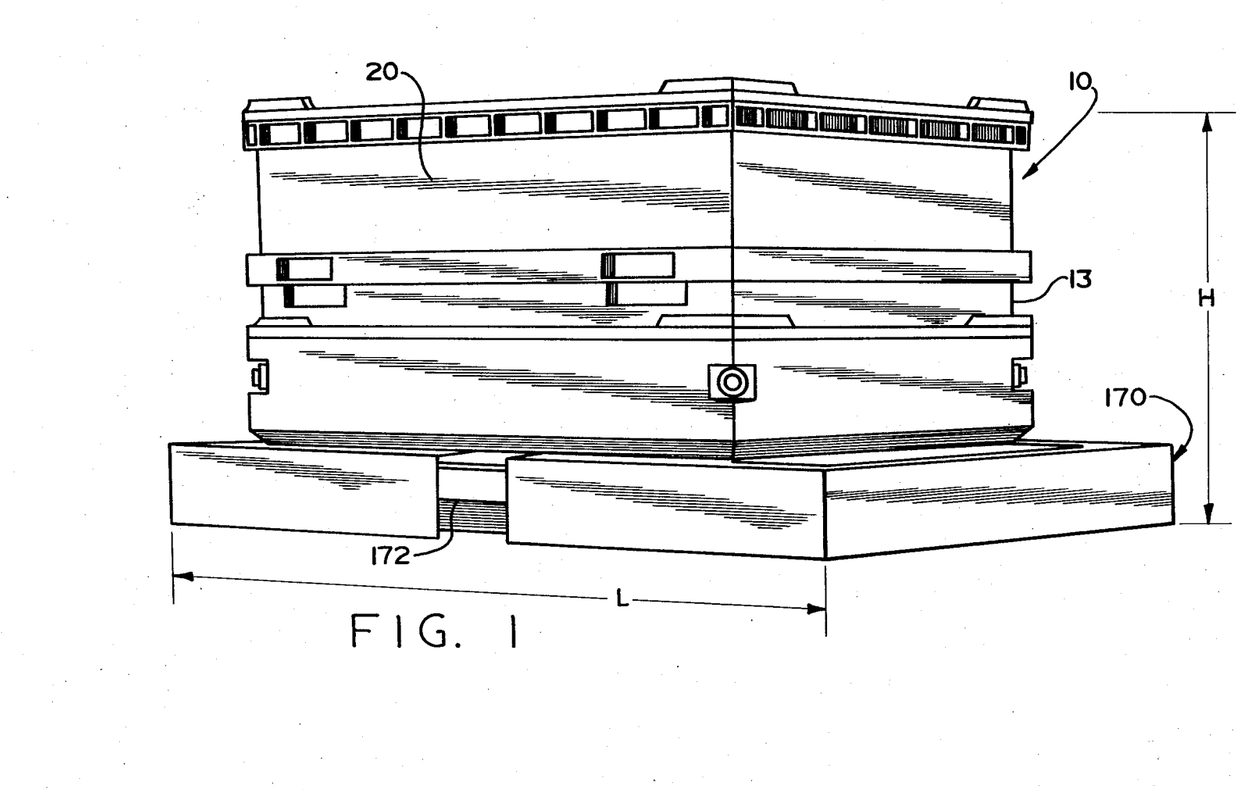
FIG. 1 is a perspective view of a vehicle constructed in accordance with the present invention.
Figure 2:
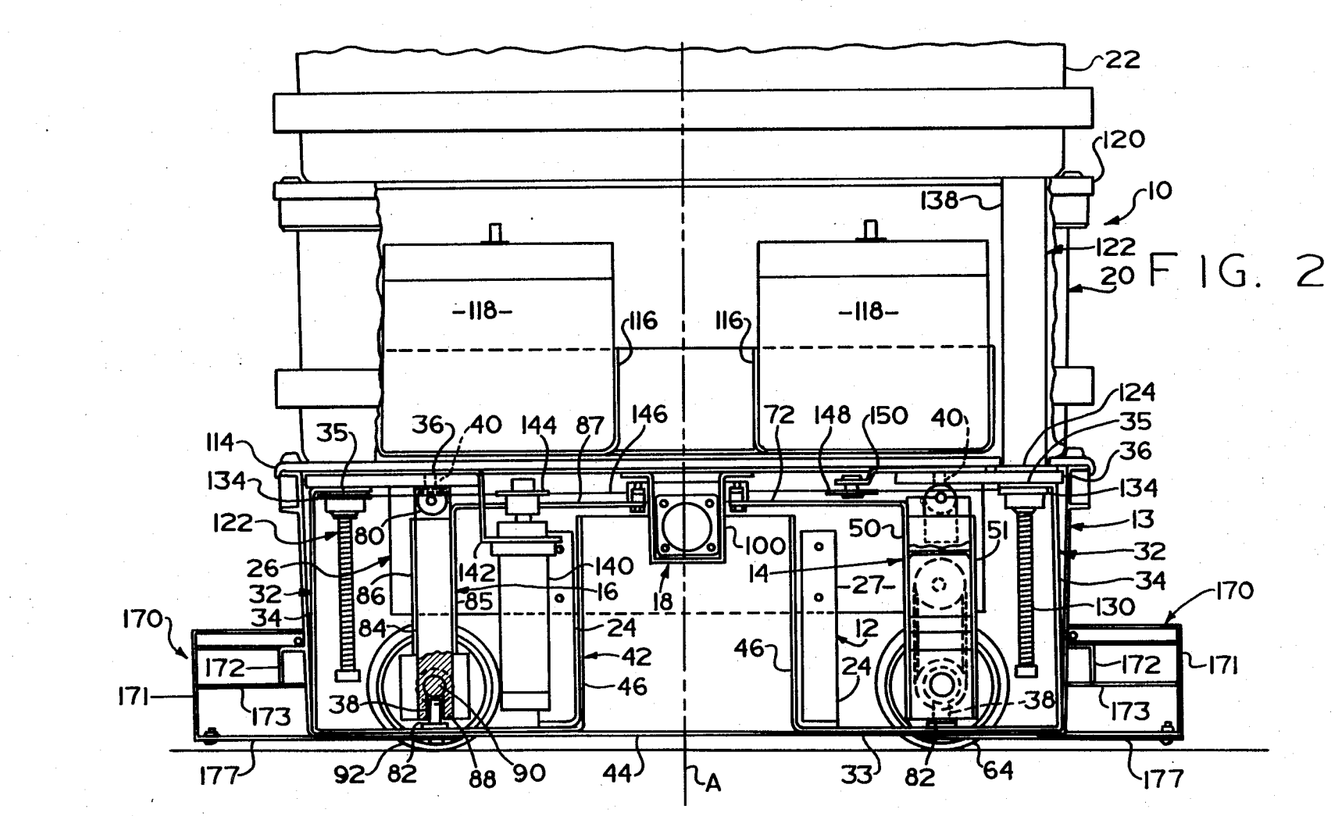
FIG. 2 is a side elevation view of the vehicle of FIG. 1 with portions removed for purposes of illustration.
Figure 4:
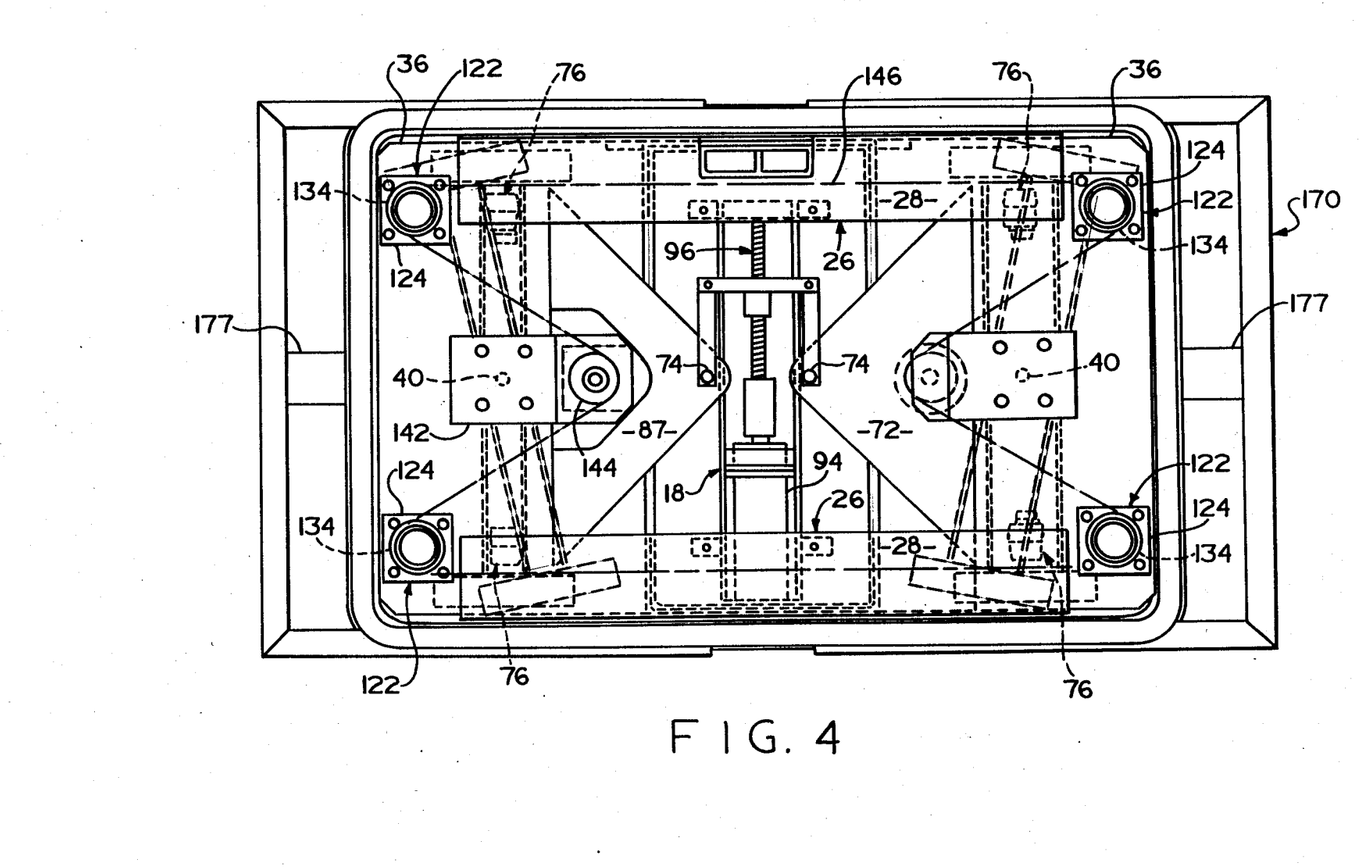
FIG. 4 is a plan view of the invention, shown with parts removed for purposes of illustration.

Referring particularly to FIGS. 2 and 4, the main frame 12 is designed to fit within a body shell 13 which is defined by a standard plastic tote box, which also defines a base for the battery carrier and load carrier sections. The frame is essentially symmetrical about centerlines A and B and comprises a pair of upstanding members 24, which are U-shaped when viewed from the front and rear ends of the vehicle; a pair of inverted L-shaped plates 26 having a vertical leg 27 bolted or otherwise fastened to the verticle legs of the member 24, and a horizontal leg 28; a pair of substantially L-shaped members 32 each having a horizontal leg 33 welded to the bottom of each of the U-shaped members 24, and a verticle leg 34 which is bent 90 degrees at its upper end to define a horizontal stub section 35; a horizontal cross member 36 is bolted to the stub section 35 and is welded to horizontal legs 28 of the L-shaped member 26.

An upstanding pivot pin 38 is welded to each of the horizontal legs 33 on the centerline B, and a downwardly extending pivot pin 40 is welded to each of the cross members 36, to support the drive wheel assembly 14 and the bogey assembly 16 as will be described below.

Referring specifically to FIG. 2, a control cartridge 42 is centrally located between the upright legs of the U-shaped members 24 and is bolted or otherwise fastened to the bottom 44 of the tote box 13. The control cartridge is a fabricated box structure comprising a plurality of upstanding walls such as 46, and contains the various control boards and connectors required to operate the vehicle. The controls and connectors for guided vehicles are well known and not part of the present invention.

Figure 5:
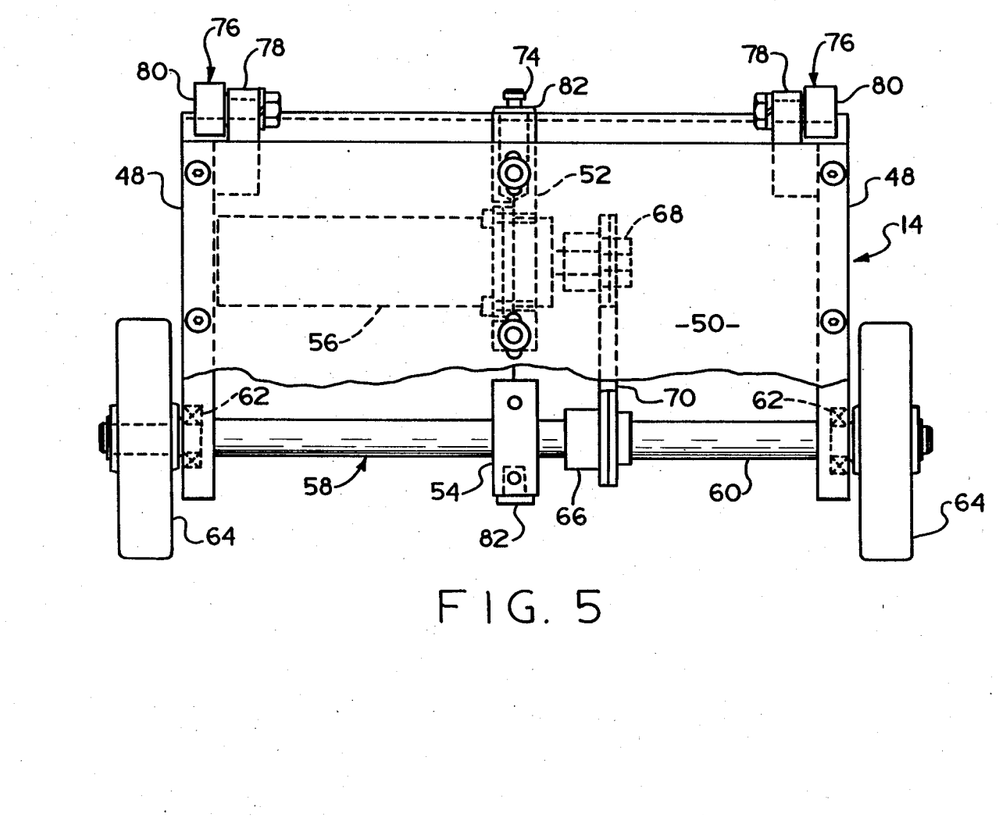
FIG. 5 is a partial end elevation view of the drive wheel assembly of the invention.
Figures 6, 9:
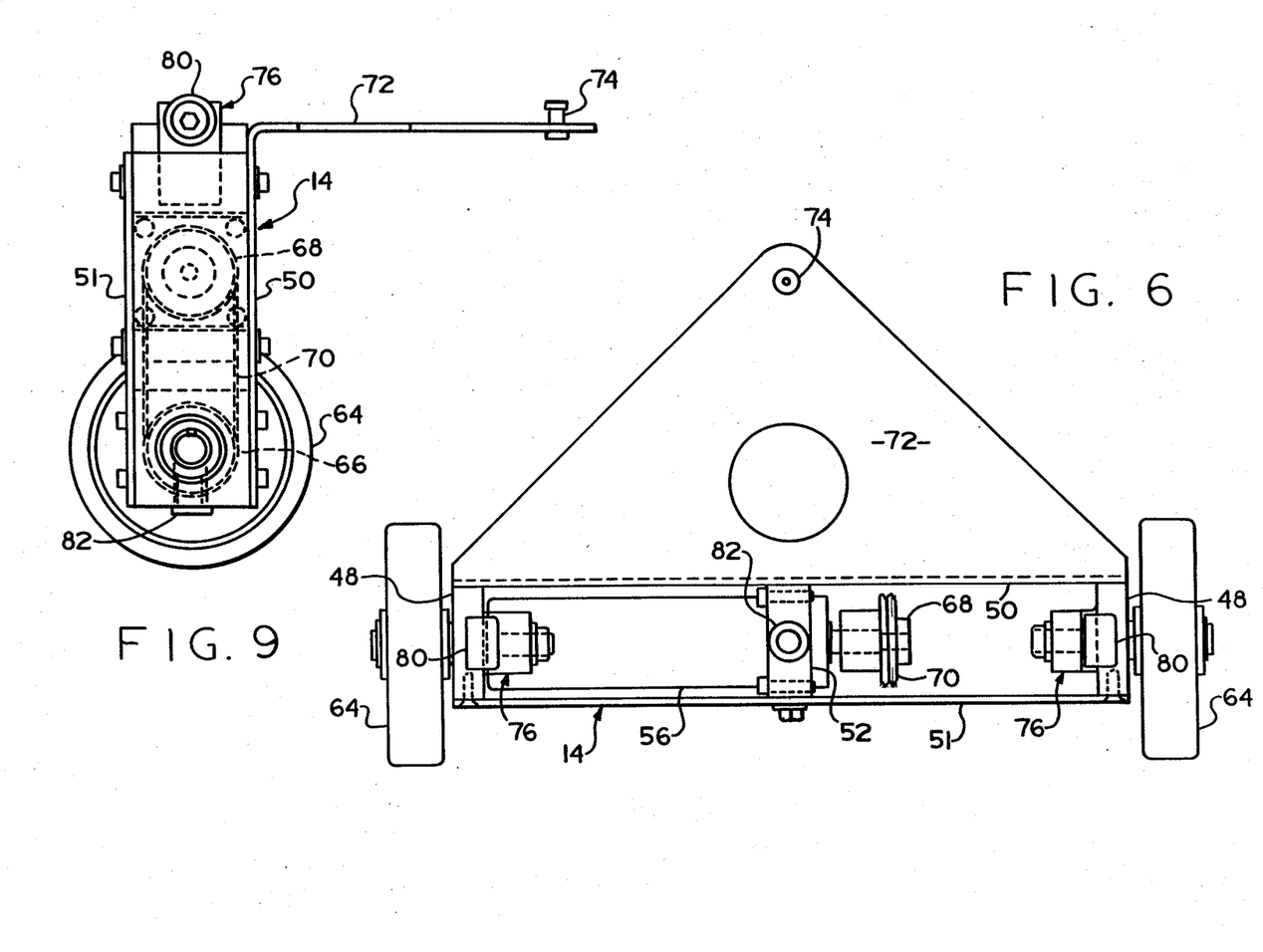
FIG. 6 is a plan view of the drive wheel assembly.
FIG. 9 is a side elevation view of the drive wheel of the vehicle.
Figure 7:
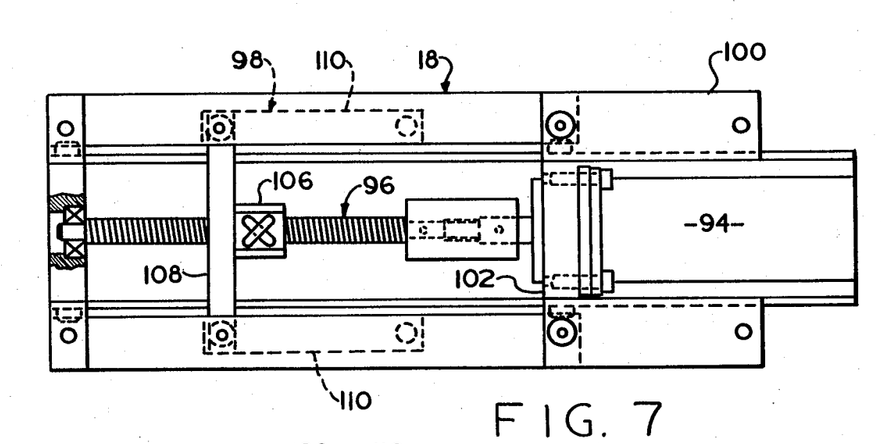
FIG. 7 is a partial plan view of the steering system of the invention.
Figure 8:
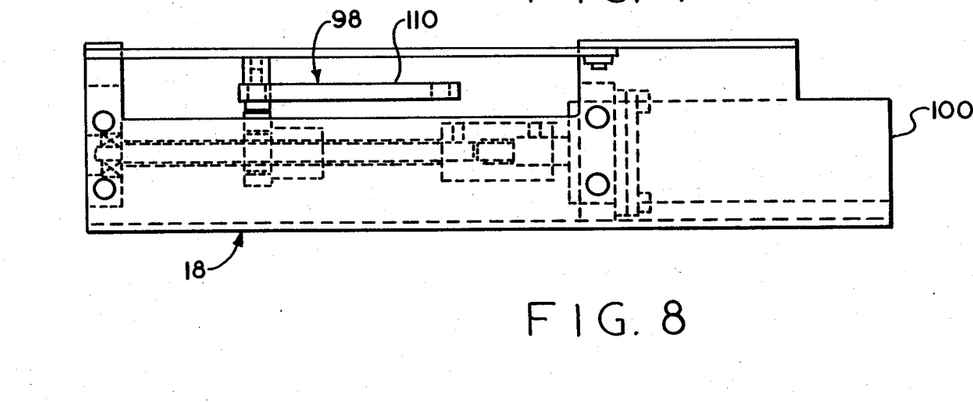
FIG. 8 is a partial elevation view of the steering system.

Referring particularly to FIGS. 5, 6 and 9, the drive wheel assembly 14 comprises a pair of upright support members 48, inner and outer plates 50 and 51 bolted to the supports, an upper pivot block 52 centrally located between the support members 48 and bolted to the front and rear plates, a lower pivot block 54 bolted to the front and rear plates, a drive motor 56 attached to the upper pivot block, and a drive axle assembly 58 received through the support plates and the lower pivot block.

The drive axle assembly 58 comprises an axle 60 supported by bearings 62 received in the supports 48, drive wheels 64 keyed to the ends of the axle 60, and a sprocket wheel 66 fixed to the axle. The drive motor 56 has a sprocket wheel 68 fixed to its output shaft, and a roller chain 70 is entrained over the sprocket wheels 66 and 68.

The inner plate 50 is substantially L-shaped, having a horizontal leg 72 which is generally triangular in plan as shown in FIG. 6, and a shoulder screw 74 is received at the apex of the triangular section for attachment to the steering system 18, as will be described in detail below.

The drive wheel assembly 14 also includes load transfer elements 76 which ensure that the weight of any load received on the vehicle 10 will be transferred to the drive and bogey axles, and not carried by the tote box structure. The transfer elements are received on the upper ends of the upright supports 48 and each comprises a block 78 welded to the support, and a roller cam assembly 80 fastened to the block with the roller in position to bear against the underside of the cross members 36.

The pivot blocks 52 and 54 include bronze bearing inserts 82 in which the pivot pins 38 and 40 are received to support the drive wheel assembly 14.

Referring to FIG. 2, the bogey assembly 16 is similar in construction to the drive wheel assembly, including upright supports 84, inner and outer plates 85 and 86, with the inner plate including a horizontal leg 87 with a shoulder screw 74 received therein; a central pivot block 88 receiving bearing inserts 82, and a pair of transfer elements 76 including roller cams 80. The bogey assembly includes no drive motor, and the axle 90 extends through the pivot block and rotates freely in bearings received in the up right supports 84. The bogey wheels 92 are not keyed to the axle 90.

Referring to FIGS. 2, 4, 7 and 8, the steering system 18 is mounted on the horizontal legs 28 of the L-shaped members 26, and comprises a U-shaped bracket 100 bolted to the member 28, a rotary electric motor 94 attached to a block 102 received between the legs of the bracket, a ball screw assembly 96 driven by the motor 94, and a linkage system 98 which is operatively connected to the drive wheel assembly 14 and the bogey assembly 16 to define a dual fifth wheel steering system.

The linkage system comprises a ball nut 106, a transverse block 108 fixed to the ball nut, and a pair of toggle links 110 pivotally attached to opposite ends of the transverse block. Referring particularly to FIG. 4, the shoulder screws 74 of the horizontal legs 72 of the drive wheel and bogey assemblies are attached to the free ends of the toggle links. To steer the vehicle 10, the steering motor 94 is energized to drive the ball screw, thus moving the ball nut to drive the toggle links up or down as viewed in FIG. 4 (transversely of the vehicle) to rotate the drive wheel assembly 14 and the bogey assembly 16 about the pivot pins 38 and 40 to steer the vehicle. As shown in FIG. 4, the broken line positions of the drive wheel and bogey assemblies illustrate typical steered positions of the wheel assemblies. It can be appreciated that the fifth wheel steering of both wheel assemblies which is provided by the invention permits the vehicle to turn very sharply about its centerpoint.

As indicated above, the body shell 13 of the vehicle 10 is preferably a standard plastic tote box with holes cut in the bottom to provide clearance for the wheels 64 and 92. In accordance with the invention, the battery carrier 20 of the vehicle is another standard tote box, which rests on a first cover plate 114 received over the body shell 13 and which is supported on the upper surfaces of the main frame assembly 12. As shown in FIG. 4, the battery carrier includes a pair of battery boxes 116 fastened to the bottom of the battery carrier to carry two automotive type batteries 118.

Figure 3:
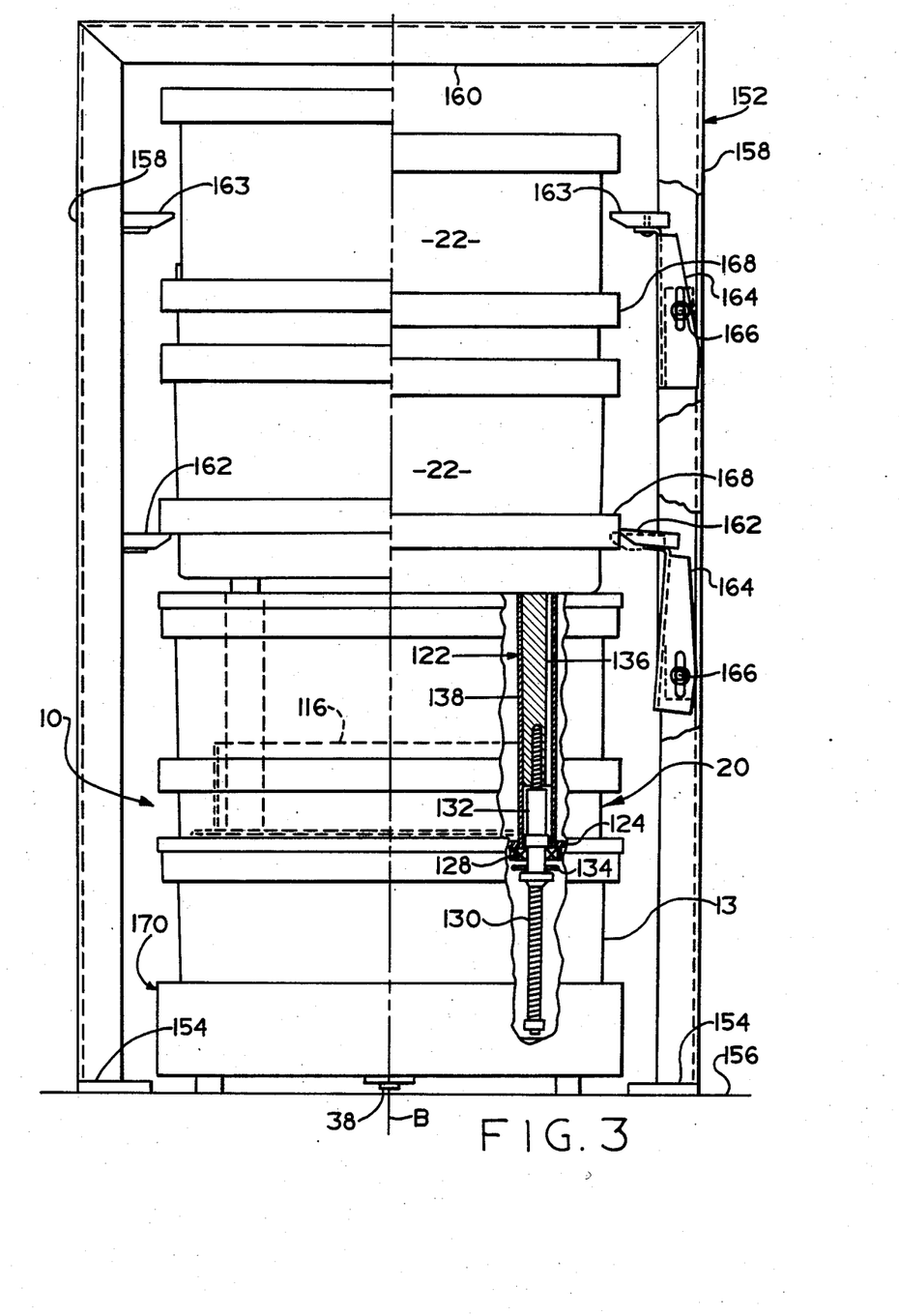
FIG. 3 is a rear elevation of the invention shown in combination with a storage rack, and with portions shown in section.

As illustrated in FIGS. 2 and 3, a second cover plate 120 is received over the battery carrier, and a plurality of load carriers 22 are stacked on top of the plate. Preferably, the load carriers are also standard plastic tote boxes which can be nested together in a known manner.

In accordance with the invention, the load carrier can be loaded and unloaded by raising the stack of carriers and depositing them in a Pickup and Delivery (P&D) stand in a manner similar to that employed in known guided vehicle transport systems.

The load carriers are raised and lower by chain-driven ball-screw lift assemblies 122 located at each corner of the vehicle as illustrated in FIG. 4. Each lift assembly is essentially identical, and the interior details of one of the units are shown in FIG. 3. A mounting flange 124 attached to the cross member 36 of the main frame (see FIG. 4) supports the assembly through a ball bearing 128. The ball screw unit comprises a ball screw 130, a ball nut 132, and a drive sprocket 134 fixed to the ball nut. A ram 136 is fixed to the upper end of the ball screw and is keyed to a guide tube 138 welded to the flange 124 to prevent rotation of the ram as it moves up and down in response to rotation of the ball nut. The guide tube extends through holes formed in the cover plate 114 and the battery carrier. The upper ends of the guide tubes 138 are open to permit the unit to engage the underside of the lowermost of the load carrier boxes 22 through holes formed in the plate 120. Alternatively, another cover plate can be stacked on top of the plate 120, with the rams 136 engaging the plate.

Referring particularly to FIGS. 2 and 4, the lift assemblies 122 are driven by an electric motor 140 supported by a bracket 142 attached to the left hand cross member 36 as viewed in FIG. 2. A drive sprocket 144 is fixed to the motor shaft, and a roller chain 146 (see FIG. 4) is entrained around the drive sprocket, the sprocket wheels 134 of the ball screw units, and around an idler sprocket 148 mounted for rotation on a bracket 150 attached to the right hand cross member 36.

When the lift assemblies are raised to lift a load within the load carriers, the load is transferred through the ball screw units to the cross members 36 of the main frame, and then through the roller cams 80 of the transfer assemblies 76 directly to the drive and bogey wheels. It can be seen in viewing FIG. 4, that the roller cam permits the load to be transferred through the main frame to the wheels in any steered position of the drive and bogey wheel assemblies.

Referring to FIG. 3, the vehicle 10 is illustrated in combination with an example of a P&D station 152. In the illustrated example, the P&D station is in the form of an elongated (into the paper) rack structure comprising base plates 154 bolted or otherwise fastened to the floor 156, a plurality of upright members 158, cross member 160, and a plurality of movable, elongated support rails 162 and 163. The support rails are attached to brackets 164 which are pivotally mounted on pins 166 received in the upright members 158. As shown by the broken line position of the rail on the right side of FIG. 3, when a vehicle 10 is within the P&D station, the rail 162 can pivot out of the way when the load carriers are raised and then move by gravity back into position to engage the lower rail 168 of one of the load carriers. Once the load carrier is supported by the rails, the lift assembly 122 can be lower and the vehicle moved out of the P&D station.

The vehicle is shown herein as supporting two nested sets of load carriers 22, those on the right of centerline B shown in a lowered position and on the left in a raised position; however, it can be appreciated that one or more load carriers can be added to the vehicle. As illustrated herein, the rails 162 and 163 can be spaced such that if the carriers 22 were raised to a higher level, the lower rail 168 of the upper load carrier would engage the rails 163, and that carrier alone could be retained in the P&D station with the lower carrier retained on the vehicle.

Referring particularly to FIGS. 2 and 4, a bumper assembly 170 is attached to the front and rear of the vehicle 10. Preferably, the bumper assembly is a flexible structure 171 supported by the lower rail 172 of the tote box which defines the body shell 13. The bumper assembly includes channel-section rails 173 which engage the lower rail 172. A plate 177 attached to the bottom of the bumper assembly extends under the bottom of the body shell and has a slot formed therein (not shown) through which the lower ends of the pivot pins 38 extend to further maintain the alignment of the bumper assembly. The bumper assembly is spring-loaded (not shown) to the position shown in FIGS. 2 and 4.

The bumper assembly includes known switches and the like (not shown) which are operable to stop operation of the vehicle when the bumper is deflected a predetermined amount by engagement with an obstruction or another vehicle.

I claim:

1. A vehicle comprising a frame; a drive wheel assembly pivotally mounted on said frame, said drive wheel assembly comprising a first vertically oriented support structure, a pair of wheels mounted for rotation on opposite sides of said support structure, a drive motor attached to said first support structure and operatively connected to at least one of said wheels, first pivot means on said first support structure defining a vertical pivot axis intersecting the axes of rotation of said wheels, and a first moment arm defined by a substantially horizontal extension of said first support structure; a bogey wheel assembly pivotally mounted on said frame, said bogey wheel assembly comprising a second vertically oriented support structure, a pair of wheels mounted for rotation on opposite sides of said second support structure, pivot means on said second support structure defining a vertical pivot axis intersecting the axes of rotation of said wheels, and a second moment arm defined by a substantially horizontal extension of said second support structure; power steering means centrally mounted on said frame between said drive and bogey wheel assemblies, said power steering means comprising a ball screw assembly mounted transversely of said vehicle for rotation about a horizontal axis centrally located between said first and second pivot means, a rotary drive motor connected to said ball screw assembly, a ball nut received on said ball screw, and means connecting said ball nut to said first and second moment arms whereby linear movement of said ball nut along said ball screw assembly is operable to rotate said drive wheel assembly and said bogey wheel assembly in opposite directions about their respective pivot axes; vertically movable load support means mounted on said frame; and transfer means acting between said frame and said drive and bogey wheel assemblies to transfer loads applied to said load support means to said drive and bogey wheel assemblies, said transfer means being operable in any steered position of said drive and bogey wheel assemblies.

2. Apparatus as claimed in claim 1 in which said load support means comprises a plurality of ball screw assemblies mounted for vertical movement on said frame, and drive means interconnecting said ball screw assemblies to effect simultaneous verticle movement thereof.

3. Apparatus as claimed in claim 2, wherein each of said ball screw assemblies includes a vertically movable ram, said ram having an upper surface defining a load engaging surface.

4. Apparatus as claimed in claim 2, in which the drive means interconnecting said ball screw assemblies comprises a rotary drive motor mounted on said frame, a drive sprocket on the output shaft of said motor, a sprocket wheel operatively attached to each of said plurality of ball screw assemblies, and a drive chain entrained about said drive sprocket and said sprocket wheels.

5. Apparatus is claimed in claim 1, in which said frame includes at least one horizontally disposed frame element, means on said frame element for mounting said load support means, said transfer means comprising roller means acting between said at least one frame element and said drive and bogey wheel assemblies.

6. Apparatus as claimed in claim 5, in which said at least one frame element comprises a first crossmember extending transversely of said vehicle and overlying said drive wheel assembly, pivot means on said first crossmember engageable with the first pivot means on said drive wheel assembly, a second crossmember extending transversely of said vehicle and overlying said bogey wheel assembly, and pivot means on said second crossmember engageable with the second pivot means on said bogey wheel assembly; said roller means comprising first roller means mounted for rotation on said drive wheel assembly and engageable with said first crossmember, said first roller means being rotatable about an axis parallel to the axes of rotation of the wheels on said drive wheel assembly and intersecting the pivot axis of said drive wheel assembly, and second roller means mounted for rotation on said bogey wheel assembly and engageable with said second crossmember, said second roller means being rotatable about an axis parallel to the axis of rotation of the wheels on said bogey wheel assembly and intersecting the pivot axis of said bogey wheel assembly.

7. Apparatus as claimed in claim 6, in which said first roller meahs comprises a first pair of rollers mounted on said first vertically oriented support structure, and said second roller means comprises a second pair of rollers mounted on said second vertically oriented support structure.

8. Apparatus as claimed in claim 1 in which said vehicle includes a body shell attached to said frame, said body shell being defined by a first plastic tote box.

9. Apparatus as claimed in claim 8, in which said vehicle includes a battery carrier, said battery carrier comprising a second plastic tote box stacked upon said first plastic tote box.

10. Apparatus as claimed in claim 9, including at least one load receptacle received on said vehicle, said load receptacle comprising a third plastic tote box received on said battery carrier and engageable with said vertically movable load support means.

11. A vehicle comprising a frame having at least one horizontally disposed element thereof; a drive wheel assembly pivotally mounted on said frame, said drive wheel assembly comprising a first vertically oriented support structure, a pair of wheels mounted for rotation on opposite sides of said support structure, a drive motor attached to said first support structure and operatively connected to at least one of said wheels, first pivot means on said first support structure defining a vertical pivot axis intersecting the axes of rotation of said wheels, and a first moment arm defined by a substantially horizontal extension of said first support structure; a bogey wheel assembly pivotally mounted on said frame, said bogey wheel assembly comprising a second vertically oriented support structure, a pair of wheels mounted for rotation on opposite sides of said second support structure, pivot means on said second support structure defining a vertical pivot axis intersecting the axes of rotation of said wheels, and a second moment arm defined by a substantially horizontal extension of said second support structure; power steering means centrally mounted on said frame between said drive and bogey wheel assemblies, said power steering means comprising a linear actuating means mounted on said vehicle for movement transversely thereto and connected to said first and second moment arms whereby movement of said linear actuating means is operable to rotate said drive wheel assembly and said bogey wheel assembly in opposite directions about their respective pivot axes; vertically movable load support means mounted on said horizontally disposed element of said frame; and transfer means acting between said frame and said drive and bogey wheel assemblies to transfer loads applied to said load support means to said drive and bogey wheel assemblies, said transfer means comprising roller means on said drive wheel assembly and on said bogey wheel assembly rotatable about axes parallel to the axes of rotation of the wheels on said drive and bogey wheel assemblies and engagable with said horizontally disposed element of said frame.

12. Apparatus as claimed in claim 11, in which said at least one frame element comprises a first crossmember extending transversely of said vehicle and overlying said drive wheel assembly, pivot means on said first crossmember engageable with the first pivot means on said drive wheel assembly, a second crossmember extending transversely of said vehicle and overlying said bogey wheel assembly, and pivot means on said second crossmember engageable with the second pivot means on said bogey wheel assembly; said roller means comprising first roller means mounted for rotation on said drive wheel assembly and engageable with said first crossmember, said first roller means being rotatable about an axis parallel to the axes of rotation of the wheels on said drive wheel assembly and intersecting the pivot axis of said drive wheel assembly, and second roller means mounted for rotation on said bogey wheel assembly and engageable with said second crossmember, said second roller means being rotatable about an axis parallel to the axis of rotation of the wheels on said bogey wheel assembly and intersecting the pivot axis of said bogey wheel assembly.

* * * * *